US007233870B1

(12) United States Patent
 Dalrymple

(10) Patent No.: US 7,233,870 B1
(45) Date of Patent: Jun. 19, 2007

(54) SPECTROMETRIC DATA CLEANSING

(75) Inventor: David Dalrymple, Fredericktown, OH (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

(21) Appl. No.: 11/332,563

(22) Filed: Jan. 13, 2006

(51) Int. Cl.
 *G01R 21/16* (2006.01)
(52) U.S. Cl. ....................................................... 702/76
(58) Field of Classification Search .................. 702/76
 See application file for complete search history.

(56) References Cited

U.S. PATENT DOCUMENTS

| | | | | |
|---|---|---|---|---|
| 5,672,869 | A | * | 9/1997 | Windig et al. ............... 250/282 |
| 6,690,966 | B1 | * | 2/2004 | Rava et al. .................. 600/473 |
| 2003/0078739 | A1 | * | 4/2003 | Norton et al. ................ 702/22 |
| 2005/0285023 | A1 | * | 12/2005 | Liu ............................. 250/221 |

OTHER PUBLICATIONS

Thermo Electron Corporation, "OMNIC For Raman Help," Excerpted from OMNIC For Raman Help File, (2006).

Thermo Electron Scientific Instruments Corporation, "OMNIC for Nicolet Almega Help," Excerpted from OMNIC For Nicolet Almega Help File, (2003).

* cited by examiner

*Primary Examiner*—John Barlow
*Assistant Examiner*—Demetrius R. Pretlow
(74) *Attorney, Agent, or Firm*—Charles B. Katz; DeWitt Ross & Stevens

(57) ABSTRACT

Spectra obtained from spectrographic readings from a sample can be filtered for artifacts, e.g., distorted data points arising from cosmic ray interference, by subtracting one spectrum from another to obtain a difference spectrum; smoothing the difference spectrum; and then calculating the difference between the smoothed and unsmoothed difference spectra to obtain a noise spectrum. The resulting noise spectrum, which represents localized differences between the original spectra, can then be reviewed for readings which exceed the norm by some predetermined amount (e.g., readings which exceed the average level of the noise spectrum by some percentage). These excessive readings constitute distorted data points, and the corresponding points on the spectra can have their values adjusted to eliminate the excessive readings, thereby removing the artifacts.

20 Claims, 7 Drawing Sheets

SPECTROMETRIC DATA CLEANSING

FIELD OF THE INVENTION

This document concerns an invention relating generally to processing and enhancement of data obtained by spectrometers (e.g., Raman, infrared, ultraviolet/visible, and other spectrometers), and more specifically to the removal of spurious data from spectrometric readings.

BACKGROUND OF THE INVENTION

Spectrometry is a well-known technique used to identify the characteristics of gas, liquid, and solid samples, wherein light is directed at a sample and the light leaving the sample is then picked up by a photosensitive detector to be analyzed for changes in wavelength. These changes provide information regarding the composition of the sample, its chemical bonds, and other features. As an example, FIG. 1 illustrates a spectrum (sometimes referred to as an "exposure") obtained from a Raman spectrometer, wherein a laser is directed at a sample and the detector captures data regarding the light scattered from the sample. Here the spectrum data is presented as a plot of light intensity versus light wavelength, with wavelength being represented by pixel numbers from the detector (which is made of an array of detector elements/pixels). The spectrum can be compared to libraries of previously-obtained reference spectra to obtain information about the sample, such as its identity and characteristics.

A commonly encountered problem in the field of spectrometry is that spurious detector readings often arise, leading to distortions in captured spectra. As an example, FIG. 2 illustrates an exposure taken from the same sample as in FIG. 1, but at a slightly later time. While FIGS. 1 and 2 appear quite similar overall, there are some notable differences—in particular, FIG. 2 bears an intensity spike at approximately pixel 650 which is absent in the spectrum of FIG. 1. A spike of this nature is often caused by transient cosmic rays, which impinge upon and excite one or more pixels/elements of the detector and thus give rise to spurious intensity readings at these pixels. Such spurious spikes can be mistaken for "real" spikes—those generated by scattered light from the sample—and they can therefore lead to errors in the interpretation of the spectrum data.

To diminish the effect of spurious spikes that may be present in an exposure, it is common to take multiple exposures of the specimen (as with FIGS. 1 and 2), average their spectra, and then perform final analysis on the averaged spectrum. Averaging of the spectra will generally reduce the intensities of spurious readings, but will not fully eliminate them. Further, averaging of multiple exposures increases the chances that spurious readings present in other exposures will also be introduced into the average, leading to further distortion in the spectrum to be analyzed. It would therefore be useful to have additional methods available for identifying and/or eliminating cosmic ray spikes and other unwanted artifacts from the spectra.

SUMMARY OF THE INVENTION

The invention, which is defined by the claims set forth at the end of this document, is directed to spectrometric data correction methods and systems, and which at least partially alleviate the aforementioned problems. A basic understanding of some of the preferred features of the invention can be attained from a review of the following brief summary of the invention, which will refer to the accompanying drawings in order to assist the reader's understanding. More details on the invention are then provided elsewhere in this document.

To remove artifacts from spectrometric data, multiple spectrometric exposures are taken from a sample of interest, with each exposure capturing a spectrum from the sample (and with each spectrum containing multiple data points representing light intensities across a range of light wavelengths). This step is exemplified by the spectra of FIGS. 1 and 2 discussed above, and is also depicted at the blocks 600 and 610 of the flowchart of FIG. 6A (wherein spectra from a sample different from that of FIGS. 1 and 2 are illustrated adjacent the blocks).

Next, a noise spectrum is isolated from the spectra, with the noise spectrum representing the differences between the spectra arising from cosmic ray impingements and similar irregularities. First, one spectrum is subtracted from another (i.e., the intensities at each wavelength of one spectrum are subtracted from the intensities at the corresponding wavelength of the other spectrum) to obtain a calculated difference spectrum. To illustrate, the calculated difference spectrum resulting from the subtraction of the spectrum of FIG. 1 from the spectrum of FIG. 2 is shown in FIG. 3. In FIG. 3, note that the spike at 650 pixels is more evident, and there is also a "bow" in the calculated difference spectrum, downwardly from the zero intensity axis, owing to phenomena such as "photobleaching," an event wherein the light leaving the sample diminishes over at least some wavelengths with successive exposures (and thus the spectrum of FIG. 2 has a slightly lower level of background intensity than the spectrum of FIG. 1 over some wavelengths). As another illustration, the calculated difference spectrum shown adjacent block 620 in FIG. 6A is the difference between the spectra shown adjacent blocks 610 and 600; again, a spike is evident, as well as a pronounced bow-like trend owing to photobleaching.

The second step in isolating the noise spectrum is to smooth the calculated difference spectrum to obtain a smoothed difference spectrum, giving an indication of what is the overall trend or "baseline" of the calculated difference spectrum. As will be discussed in greater detail below, a large variety of conventional data smoothing techniques maybe used for this step. FIG. 4 illustrates the smoothed difference spectrum generated from the calculated difference spectrum of FIG. 3 by the use of N-point mean smoothing (with N=25), i.e., each pixel along the wavelength axis has its intensity averaged with the intensities of the 12 adjacent pixels at its opposite sides (and thus the total average spans 25 points for each pixel). Similarly, in FIG. 6A, the smoothed difference spectrum shown adjacent block 630 was generated from the calculated difference spectrum shown adjacent block 620 by the use of N-point median smoothing (discussed below).

Finally, the noise spectrum is obtained by determining the difference between the smoothed difference spectrum and the calculated difference spectrum. FIG. 5 shows the results of subtracting the smoothed difference spectrum of FIG. 4 from the calculated difference spectrum of FIG. 3, effectively providing the calculated difference spectrum of FIG. 3 "normalized" about zero intensity. Similarly, the noise spectrum adjacent block 640 in FIG. 6A was generated by subtracting the smoothed difference spectrum adjacent block 630 from the calculated difference spectrum adjacent block 620.

At least a portion of the noise spectrum may then be subtracted from one or more of the first and second spectra to correct the spectra. A preferred methodology is to specifically identify any distorted data points, i.e., those wavelengths/intensities in the noise spectrum which are so exceptional that they have a high probability of corresponding to cosmic ray or similar artifacts (as opposed to background noise). A particularly useful approach is to calculate the average intensity of the noise spectrum—which, as may be gathered from FIG. 5, would be closer to zero if no artifacts (such as the one near 650 pixels) are present—and specifically identify distorted data points as being at those wavelengths at which the intensity in the noise spectrum exceeds the average intensity of the noise spectrum by some predefined amount. For example, if the average intensity of the noise spectrum of FIG. 5 (preferably an RMS average, so that positive and negative values do not cancel) was 100, all wavelengths having intensities at some desired level above 100 could be identified as distorted data points, and their intensities could be subtracted from the intensities of the second spectrum at the corresponding wavelength. Similarly, all wavelengths having intensities at some desired level below −100 could be identified as distorted data points, and their intensities could be subtracted from the intensities of the first spectrum at the corresponding wavelength. The resulting corrected spectrum (or spectra) can then be substituted and used in place of the original(s). To illustrate, the noise spectrum shown adjacent block 650 in FIG. 6A shows a pair of phantom lines drawn at the positive and negative values of the average intensity of the noise spectrum, and several spikes extend above and below the band defined by these lines.

Most preferably, a user operating the correction system could be permitted to set/enter a cutoff threshold value, as by applying some multiplier M to the average intensity of the noise spectrum to thereby define some cutoff intensity. All intensities which then exceed the cutoff intensity (including those that fall below the negative of this value) could then be identified as distorted data points. As an example, a user might be allowed to filter out intensities which, in the noise spectrum, exceed cutoff intensities equal to (for example) 3, 6, or 9 times the average intensity of the noise spectrum. The noise spectrum shown adjacent block 660 in FIG. 6B shows a pair of solid lines drawn at a cutoff intensity equal to two times the positive and negative values of the average intensity of the noise spectrum (i.e., M=2). One spike stands conspicuously above this cutoff intensity, and it therefore defines a distorted data point at this wavelength. The spectrum adjacent block 670 then illustrates the second spectrum of block 610—this spectrum being the source of the excessive spike (as indicated by the spike's positive value)—with the spectrum adjusted to have the intensity at the spike wavelength set to a value which generates a corresponding zero-value intensity at the same wavelength of the noise spectrum of block 640.

The foregoing correction steps require that at least two spectra (exposures) be taken from a sample of interest, but the methodology is also usable where additional spectra are obtained. In this case, the foregoing method can simply select one of the spectra for use as the first or "datum" spectrum (i.e., the spectrum to be subtracted from the others to obtain the noise spectra to be used in correcting the others). Alternatively, the method can be performed between all pairs of spectra: for example, the first spectrum can be corrected with respect to the second, and can then be corrected versus the third, and so on. Once the first spectrum has been corrected with respect to all other spectra, the second spectrum can then be corrected versus the third, the fourth, and so on. Regardless of how all spectra/exposures are corrected, once all are corrected, they may then be averaged together to obtain a final spectrum to be used for analysis.

The foregoing methodology is preferably implemented in the hardware and/or software setup of a spectrometer, such that a user may implement corrections to spectra immediately after capturing some number of exposures of a sample. However, the invention could be implemented in standalone software and computers (or other programmed/programmable systems) which apply the methodology to supplied spectrometric data.

Further advantages, features, and objects of the invention will be apparent from the following detailed description of the invention in conjunction with the associated drawings.

DETAILED DESCRIPTION OF PREFERRED VERSIONS OF THE INVENTION

The foregoing discussion merely relates to exemplary preferred versions of the invention, and these versions can be modified and enhanced in a variety of ways. Following is a review of certain exemplary modifications.

Initially, as discussed above, the average intensity of the noise spectrum may be used to define a cutoff intensity, and intensities in the noise spectrum which exceed the cutoff intensity (either above or below the zero intensity axis) to some desired degree can then be identified as distorted data points. Naturally, the value of any cutoff intensity based on the average intensity of the noise spectrum will vary depending on how the average noise spectrum intensity is calculated. As previously noted, the average intensity of the noise spectrum could be (but preferably is not) the simple arithmetic mean of all intensities across the noise spectrum (since positive and negative intensities will cancel). Thus, it is preferable to use some averaging method which does not involve such cancellation, as by calculating a root mean square (RMS) average (i.e., square root of the sum of squares) of the intensities. Alternatively, another averaging method could be used instead, such as averaging the absolute values of the intensities or using weighted averaging.

Figure 4:
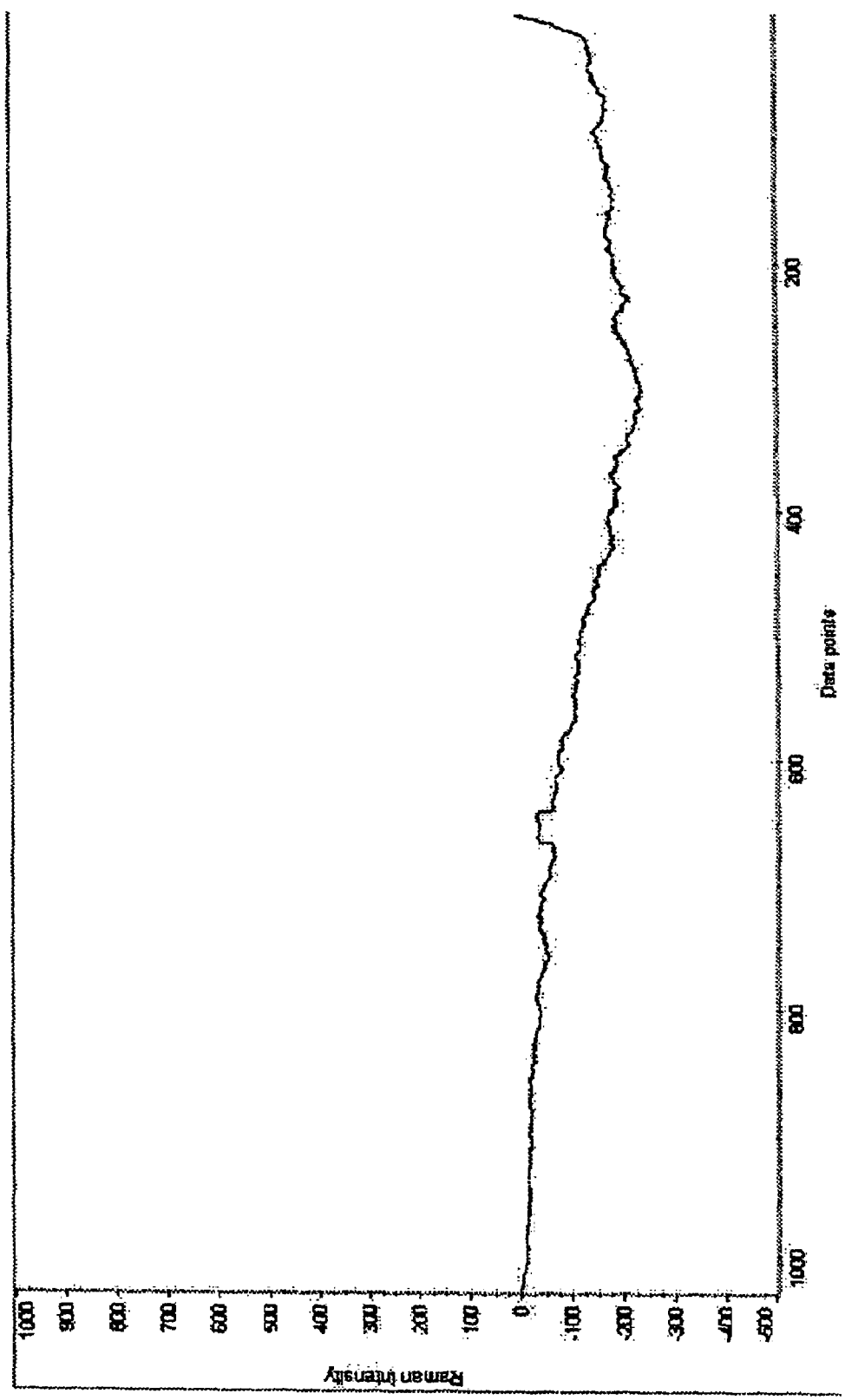
FIG. 4 is a plot of the smoothed difference spectrum generated from the performance of a data smoothing operation on the calculated difference spectrum of FIG. 3.

Additionally, when calculating the smoothed difference spectrum, different smoothing methods may be used other than N-point mean smoothing, e.g., standard methods such as N-point mean smoothing, loess smoothing, Savitzky- Golay filtering, etc. The choice of the smoothing algorithm can also affect the ultimate correction. To illustrate, note in the smoothed difference spectrum of FIG. 4 that a "hump" appears around 650 pixels owing to the effect of the artifact spike near that location: since N-point mean smoothing will include the intensity of the artifact when calculating the mean intensities at the neighboring points, the artifact artificially inflates the intensities at the neighboring points. Other smoothing methods can eliminate this distortion. For example, N-point median smoothing—which calculates the smoothed intensity at any point as being the median of the intensities of that point and the neighboring N/2 points (with N/2 being truncated to an integer value where N is an odd value)—effectively discards outlying points, and will therefore tend to eliminate the distortions introduced by artifacts.

In similar fashion, when identifying distorted data points, it is possible that any artifacts resulting in particularly high intensities may inflate the average intensity of the noise spectrum, and thus any cutoff intensity based on the average intensity of the noise spectrum. This can increase the set cutoff intensity to such an extent that some lower-intensity artifacts may not be identified as distorted data points, and therefore may not be eliminated. Thus, once any spectra are corrected, it is useful to repeat the aforementioned data cleansing process—isolating a noise spectrum from the (corrected) spectra, calculating the new average intensity of the noise spectrum, and again identifying any distorted data points within the (corrected) spectra—with the identification of the distorted data points being based on the new average intensity from the already-corrected spectra. This iterative process of repeatedly correcting the spectra might be stopped after some set number of iterations, or when some other criterion is met, e.g., once the average intensity of the noise spectrum only exhibits minor change between successive iterations.

It is emphasized that once the noise spectrum is determined, correction of the spectra may occur in a variety of ways. As noted above, a preferred method is to allow a user to select some cutoff threshold value which defines the cutoff intensity beyond which distorted data points will be filtered from the noise spectrum. While this could be done (for example) by simply allowing the user to apply some multiplier M to the average intensity of the noise spectrum to attain some cutoff intensity (with M preferably being greater than 1), it could also be done in other ways. For example, it could be done graphically by displaying the noise spectrum to the user, and the user could then move a cursor to some point in the display above the zero intensity axis, and click a button or otherwise input the selected point, to define the cutoff intensity. All intensity spikes which then extend beyond the cutoff band in the display (the cutoff band ranging above and below the zero intensity axis by the cutoff intensity) could then be identified as distorted data points. The corresponding data points in the first and second spectra which give rise to these distorted data points may then have their intensities reduced to result in a noise spectrum resting within the cutoff band.

Figure 1:
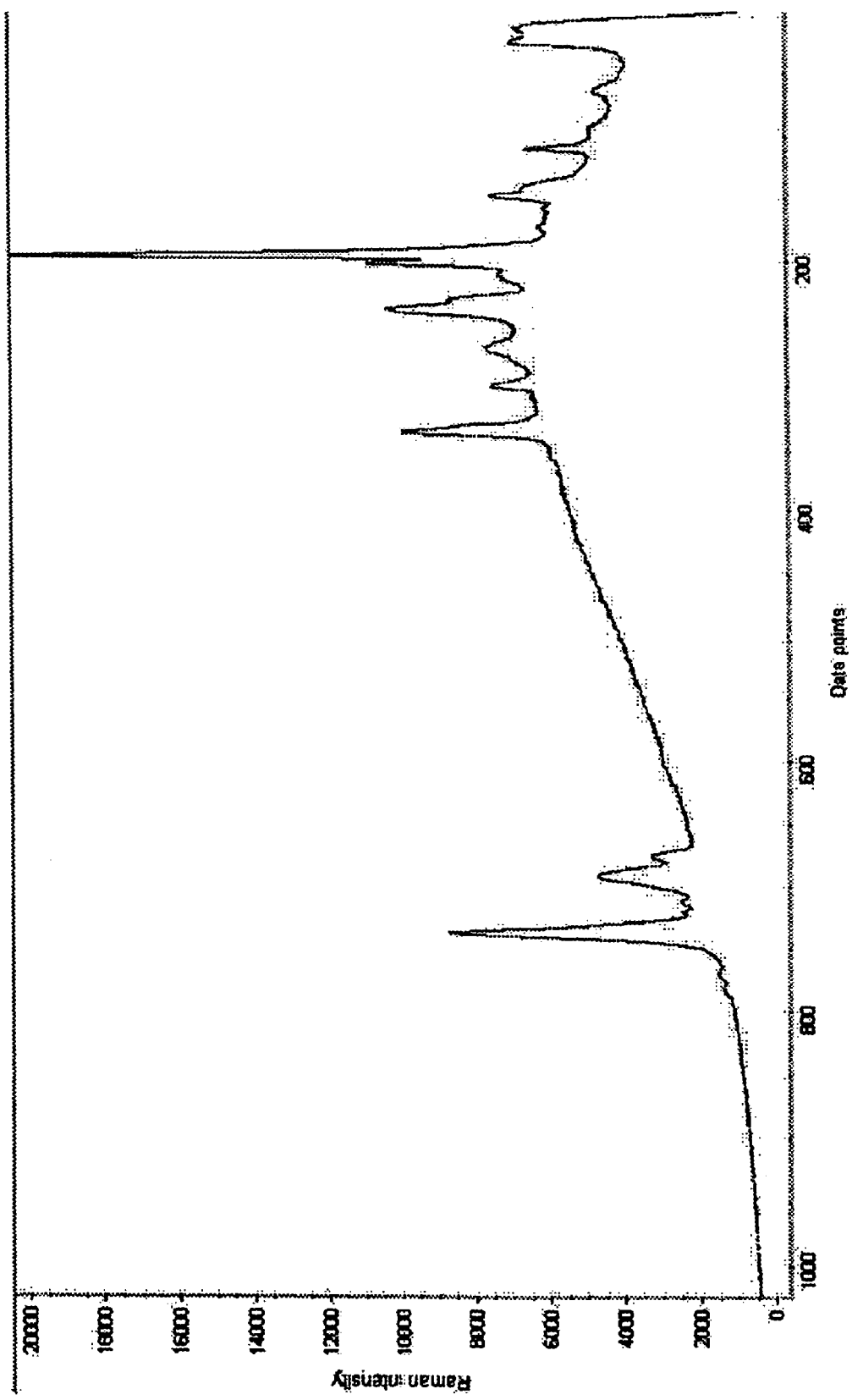
FIG. 1 is a plot of a spectrum showing the intensity of scattered (Raman) light versus wavelength(detector pixel number) from a sample, as measured by a Raman spectrometer.
Figure 2:
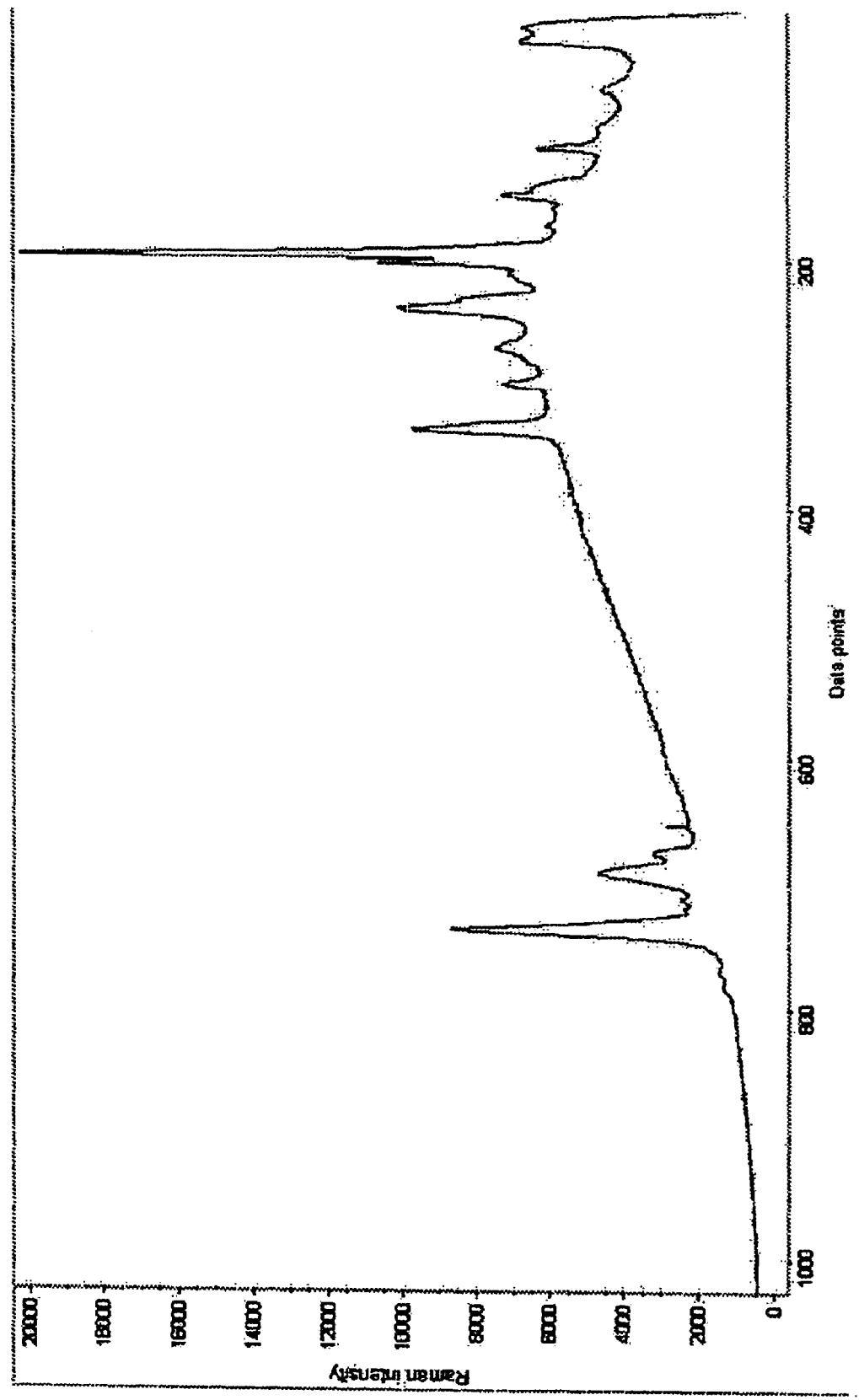
FIG. 2 is another plot of a spectrum showing the intensity of scattered light versus wavelength for the same sample, with this spectrum illustrating some differences from that of FIG. 1 (most notably a spike near 650 pixels which is absent from the plot of FIG. 1).
Figure 3:
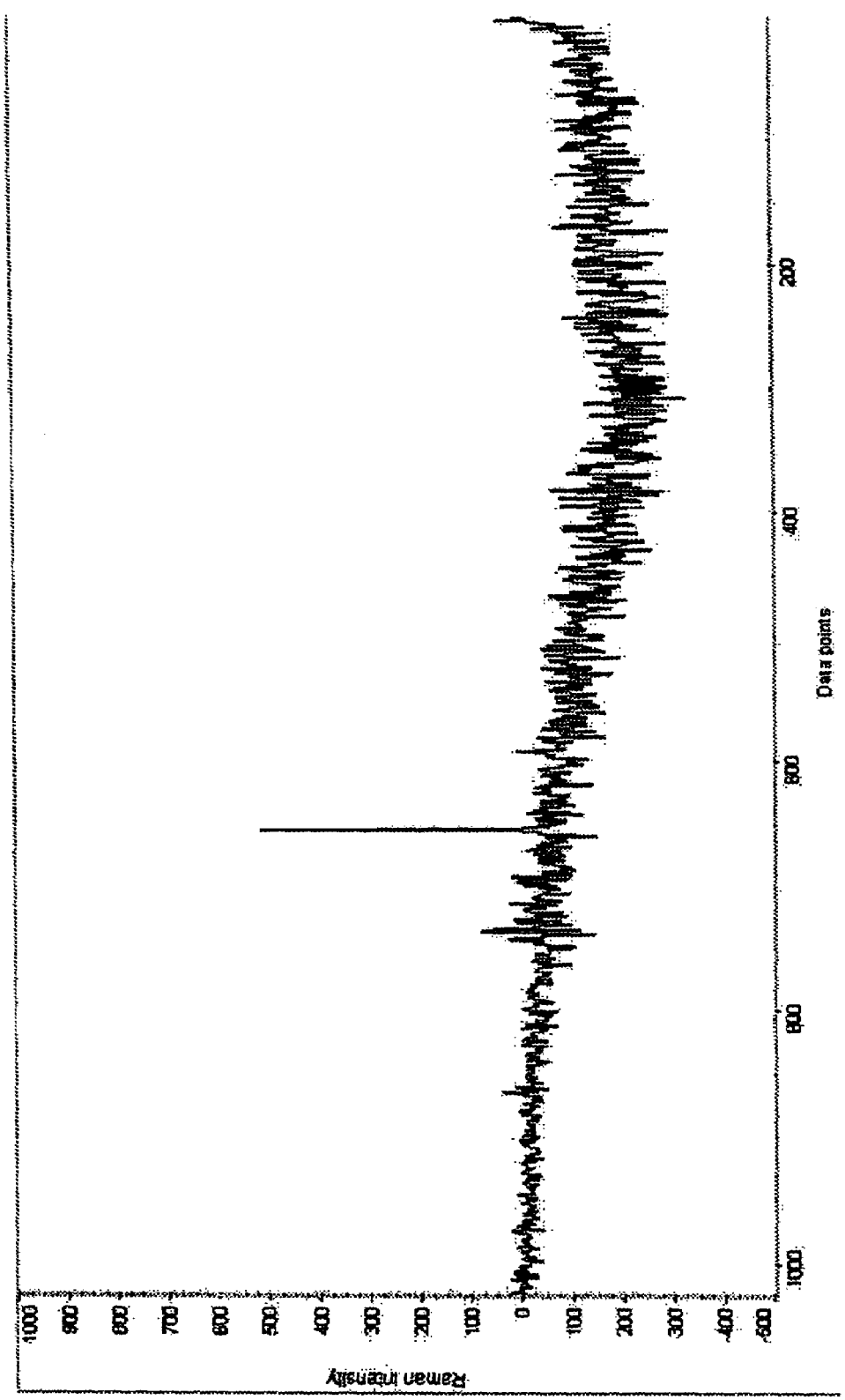
FIG. 3 is a plot of the calculated difference spectrum derived from the spectra of FIGS. 1 and 2 (by subtracting the spectrum of FIG. 1 from the spectrum of FIG. 2).
Figure 5:
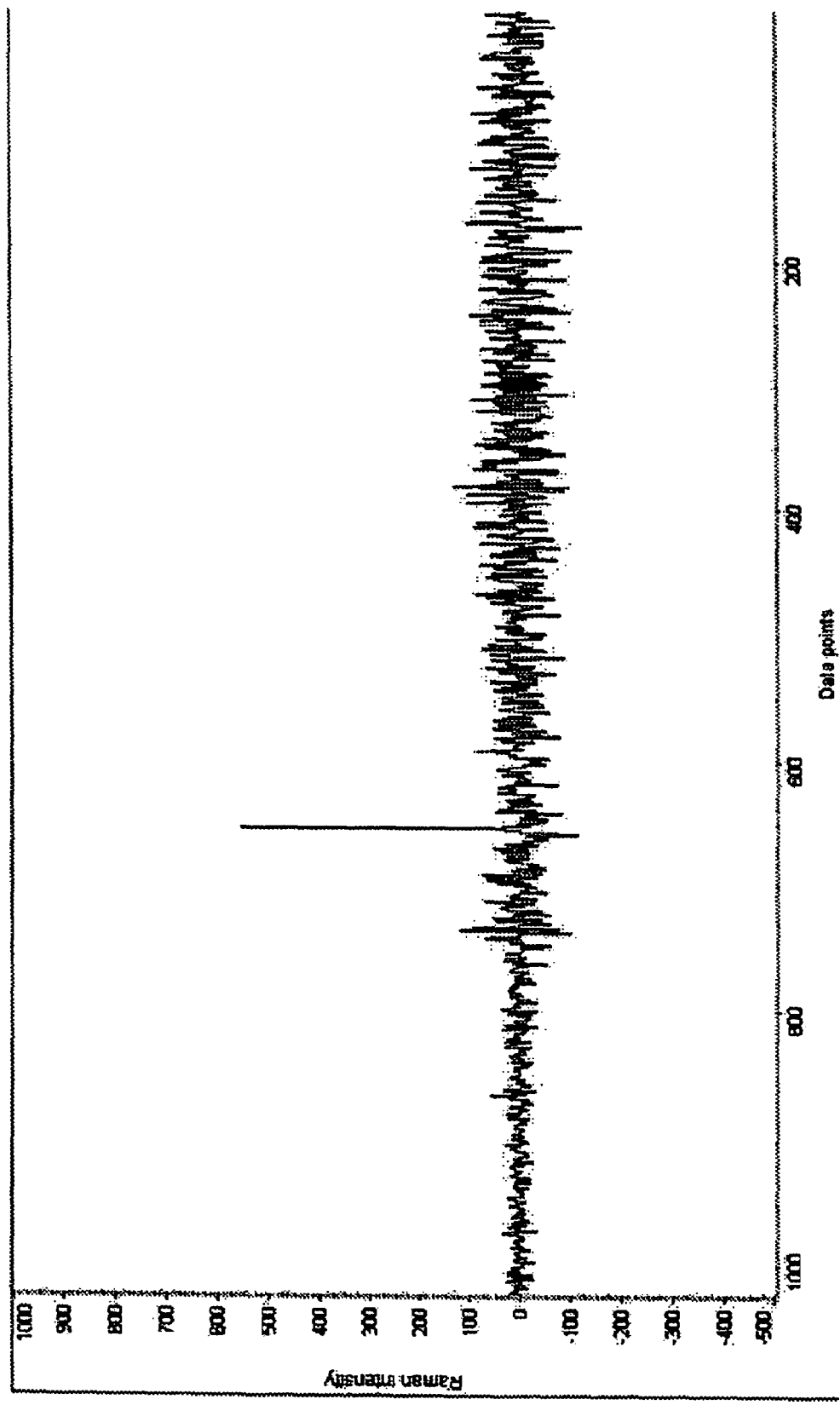
FIG. 5 is a plot of the noise spectrum created by subtracting the smoothed difference spectrum of FIG. 4 from the calculated difference spectrum of FIG. 3.
Figure 6A:
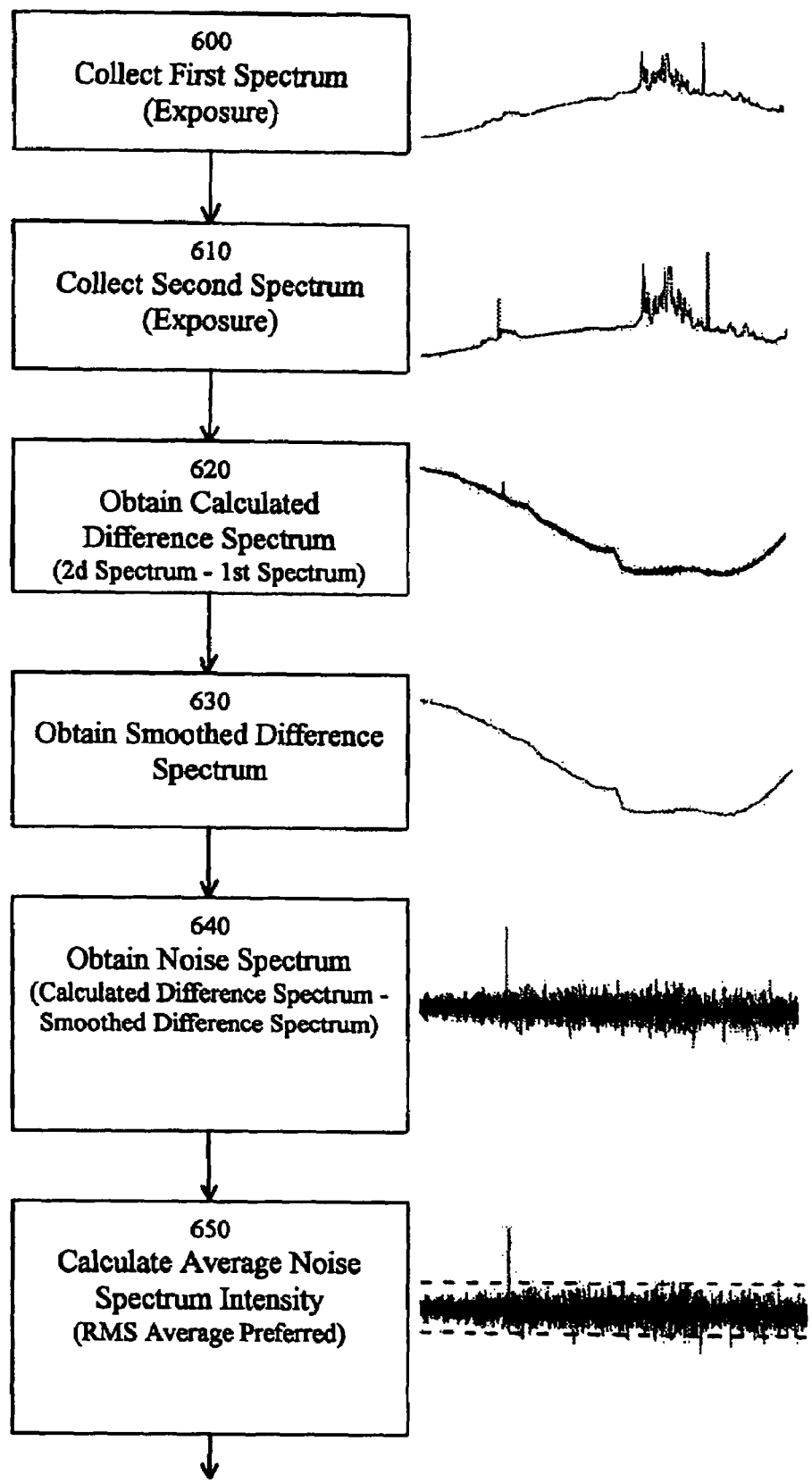
FIG. 6 is a flowchart illustrating a preferred version of the spectrum correction method described above.
Figure 6B:
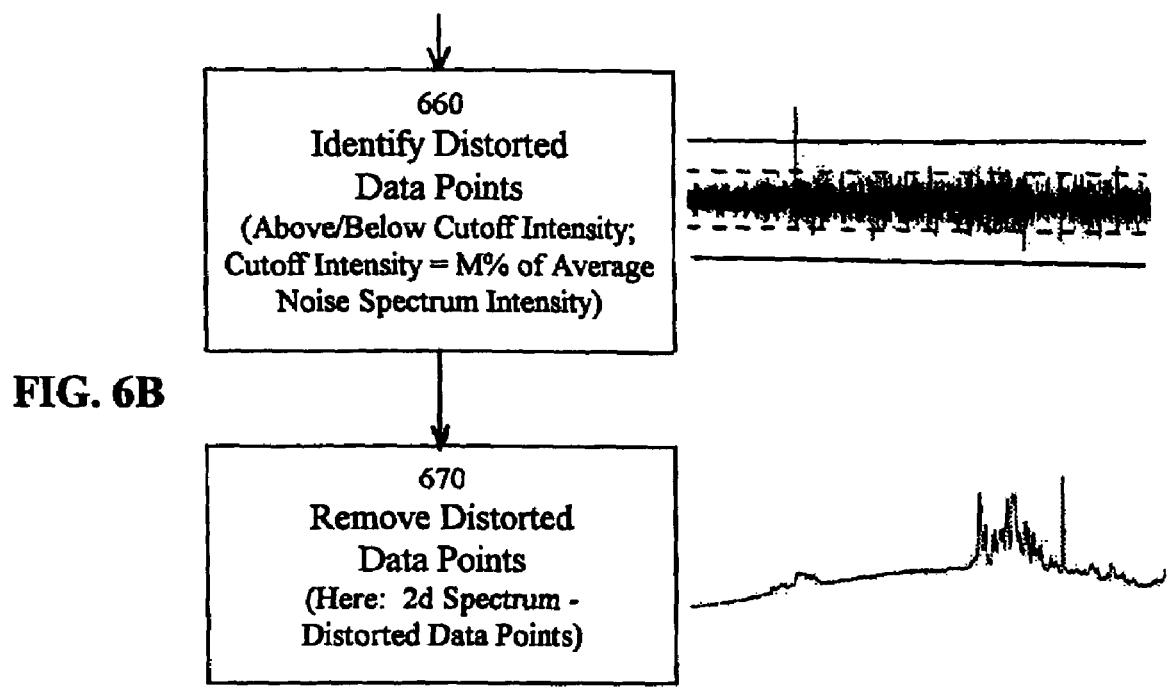

However, correction could instead (or also) be performed without the need for the user to define any cutoff threshold value or cutoff intensity; for example, positive intensities in the noise spectrum can simply be subtracted from the second spectrum, and negative intensities in the noise spectrum can be subtracted from the first spectrum, to obtain corrected spectra. As a basic example, all positive intensities in the noise spectrum of FIG. 5 represent wavelengths at which the second spectrum (FIG. 2) exceeds the first spectrum (FIG. 1), and thus these positive intensities could be subtracted from the second spectrum to obtain a simple correction. (In essence, this amounts to adjusting the intensities at these wavelengths in the second spectrum to the intensity values at the corresponding wavelengths in the first spectrum.) Similarly, all negative intensities in FIG. 5, which represent wavelengths at which the first spectrum (FIG. 1) exceeds the second spectrum (FIG. 2), could be subtracted from the first spectrum to correct it. However, since much of the variance about zero intensity in the noise spectrum of FIG. 5 is due to inherent background noise (which is assumed to have a normal distribution about zero intensity), this procedure would "correct" the spectra in response to data which are not statistically significant (i.e., they are not known with high confidence to be true data errors). Thus, a more discerning correction methodology is preferred, one which filters out only those data points which have high probability of being true data errors.

The invention is not intended to be limited to the exemplary versions of the invention described above, but rather is intended to be limited only by the claims set out below. Thus, the invention encompasses all different versions that fall literally or equivalently within the scope of these claims.

What is claimed is:

1. A method for artifact removal from spectrometric data comprising the steps of:
   a. providing a first spectrum and a second spectrum from a sample, each spectrum containing multiple data points representing light intensities across a range of light wavelengths;
   b. subtracting the first spectrum from the second spectrum to obtain a calculated difference spectrum;
   c. smoothing the calculated difference spectrum to obtain a smoothed difference spectrum;
   d. subtracting the smoothed difference spectrum from the calculated difference spectrum to obtain a noise spectrum; and
   e. correcting one or more of the first and second spectra by subtracting at least a portion of the noise spectrum therefrom; and
   f. producing at least one corrected spectrum.

2. The method of claim 1 wherein the portion of the noise spectrum subtracted from one or more of the first and second spectra is defined by:
   a. calculating the average intensity of the noise spectrum; and
   b. identifying any wavelength in the noise spectrum at which the intensity in the noise spectrum exceeds the average intensity of the noise spectrum by a predefined amount.

3. The method of claim 1:
   a. wherein the portion of the noise spectrum subtracted from one or more of the first and second spectra has an intensity greater than or equal to the average intensity of the noise spectrum multiplied by a factor of M, M being greater than 1; and
   b. further comprising the step of collecting from a user a cutoff threshold value which determines the value of M.

4. The method of claim 1 further comprising the step of:
   a. substituting the corrected spectrum or spectra in place of the corresponding original spectrum or spectra in step a. of claim 1; and
   b. repeating steps b.–e. of claim 1.

5. The method of claim 1 wherein the smoothed difference spectrum is obtained by setting the intensity of each data point in the calculated difference spectrum equal to one of:
   a. the mean of adjacent data points, and
   b. the median of adjacent data points.

6. A method for artifact removal from spectrometric data comprising the steps of:
   a. providing a first spectrum and a second spectrum from a sample, each spectrum containing multiple data points representing light intensities across a range of light wavelengths;
   b. subtracting the first spectrum from the second spectrum to obtain a calculated difference spectrum;
   c. smoothing the calculated difference spectrum to obtain a smoothed difference spectrum;
   d. subtracting the smoothed difference spectrum from the calculated difference spectrum to obtain a noise spectrum;
   e. calculating the average intensity of the noise spectrum;
   f. identifying a distorted data point within one of the first spectrum and the second spectrum, the distorted data point corresponding to a wavelength at which the intensity in the noise spectrum is greater than the average intensity of the noise spectrum; and
   g. decreasing the intensity of the distorted data point in the first or second spectrum wherein the distorted data point resides; and
   h. producing a first or second corrected spectrum.

7. The method of claim 6:
   a. wherein the distorted data point has an intensity greater than or equal to the average intensity of the noise spectrum multiplied by a factor of M, M being greater than 1; and
   b. further comprising the step of collecting from a user a cutoff threshold value which determines the value of M.

8. The method of claim 6 wherein the intensity of the distorted data point in the first or second spectrum is decreased to an intensity less than or equal to that at the corresponding wavelength in the second or first spectrum wherein the distorted data point does not reside.

9. The method of claim 6 further comprising the step of:
   a. substituting the corrected first or second spectrum in place of the corresponding first or second spectrum in step a. of claim 6 and
   b. repeating steps b.–f. of claim 6.

10. The method of claim 6 further comprising the step of averaging the first and second spectra after any correction is applied.

11. The method of claim 6 wherein the smoothed difference spectrum is obtained by setting the intensity of each data point in the calculated difference spectrum equal to the mean of adjacent data points.

12. The method of claim 6 wherein the smoothed difference spectrum is obtained by setting the intensity of each data point in the calculated difference spectrum equal to the median of adjacent data points.

13. The method of claim 6 wherein the average intensity of the noise spectrum is calculated by using RMS averaging.

14. A method for artifact removal from spectrometric data comprising the steps of:
   a. providing a first spectrum and a second spectrum from a sample;
   b. isolating a noise spectrum from the first spectrum and the second spectrum;
   c. calculating the average intensity of the noise spectrum;
   d. defining a cutoff intensity, the cutoff intensity being greater than the average intensity of the noise spectrum;
   e. identifying a distorted data point within one of the first spectrum and second spectrum, the distorted data point corresponding to a data point in the noise spectrum having an intensity greater than the cutoff intensity; and
   f. correcting the first spectrum or second spectrum which contains the distorted data point by adjusting the intensity of the distorted data point; and
   g. producing at least one corrected spectrum.

15. The method of claim 14 wherein the distorted data point:
   a. corresponds to the data point in the noise spectrum having an intensity greater than the cutoff intensity; and
   b. is the data point in the first spectrum or second spectrum having the greater intensity.

16. The method of claim 14 further comprising the step of repeating steps b.–f. of claim 15 until no distorted data points remain in the first spectrum or second spectrum.

17. The method of claim 14:
   a. wherein the method is implemented via software, and
   b. further comprising the step of obtaining the cutoff intensity from user input.

18. The method of claim 14 wherein the step of isolating a noise spectrum from the first spectrum and the second spectrum includes the steps of:
   a. subtracting the first spectrum from the second spectrum to obtain a calculated difference spectrum;
   b. smoothing the calculated difference spectrum to obtain a smoothed difference spectrum;
   c. subtracting the smoothed difference spectrum from the calculated difference spectrum to obtain the noise spectrum.

19. The method of claim 18 wherein the calculated difference spectrum is smoothed by modifying the intensity of each data point within the calculated difference spectrum to a value equal to one of:
   a. the average, and
   b. the median,
   of:
   1) the intensity of the data point, and
   2) the intensities of some predetermined number of adjacent data points, within the calculated difference spectrum.

20. The method of claim 14 further comprising the step of calculating an averaged signal spectrum from the corrected first or second spectrum and the other spectrum.

* * * * *

UNITED STATES PATENT AND TRADEMARK OFFICE
CERTIFICATE OF CORRECTION

PATENT NO.       : 7,233,870 B1                                    Page 1 of 1
APPLICATION NO.  : 11/332563
DATED            : June 19, 2007
INVENTOR(S)      : David Dalrymple It is certified that error appears in the above-identified patent and that said Letters Patent is hereby corrected as shown below:

In the claims:
Column 8, claim 16, line 23
"claim 15" should be replaced with --claim 14--

Signed and Sealed this

Eleventh Day of December, 2007

JON W. DUDAS
*Director of the United States Patent and Trademark Office*